US012556635B2

(12) United States Patent
Artuso

(10) Patent No.: US 12,556,635 B2
(45) Date of Patent: Feb. 17, 2026

(54) METHODS AND SYSTEMS FOR GENERATING DYNAMIC VOICEMAIL GREETINGS

(71) Applicant: T-Mobile USA, Inc., Bellevue, WA (US)

(72) Inventor: Daniel Frank Artuso, Concord, CA (US)

(73) Assignee: T-Mobile USA, Inc., Bellevue, WA (US)

(*) Notice: Subject to any disclaimer, the term of this patent is extended or adjusted under 35 U.S.C. 154(b) by 441 days.

(21) Appl. No.: 17/966,640

(22) Filed: Oct. 14, 2022

(65) Prior Publication Data

US 2024/0129409 A1    Apr. 18, 2024

(51) Int. Cl.
*H04M 3/533*    (2006.01)
*H04M 3/42*    (2006.01)

(52) U.S. Cl.
CPC ... *H04M 3/53391* (2013.01); *H04M 3/42348* (2013.01)

(58) Field of Classification Search
CPC ........... H04W 4/12; H04W 4/16; H04W 4/08; H04W 12/02; H04W 8/20; H04W 8/245; H04W 12/06; H04W 92/18; H04W 76/12; H04W 8/26
See application file for complete search history.

(56) References Cited

U.S. PATENT DOCUMENTS

| | | | |
|---|---|---|---|
| 7,376,220 B2 | 5/2008 | Broussard et al. | |
| 9,800,729 B2 | 10/2017 | Swanburg et al. | |
| 10,951,756 B1* | 3/2021 | Silverstein | H04M 3/436 |
| 2010/0215157 A1* | 8/2010 | Narayan | H04M 3/53391 379/88.19 |
| 2010/0273443 A1* | 10/2010 | Forutanpour | H04L 51/046 455/414.1 |
| 2012/0071138 A1* | 3/2012 | Wright | H04M 1/645 455/413 |

* cited by examiner

*Primary Examiner* — Kwasi Karikari
(74) *Attorney, Agent, or Firm* — Lee & Hayes, P.C.

(57) ABSTRACT

Methods and systems for generating dynamic voicemail greetings are disclosed. According to an implementation, a voice call made from a caller to a recipient is directed to a voicemail server when the recipient is unreachable. The voicemail server may determine a relationship between the caller and the recipient. The voicemail server may further determine at least one of location data, event data, or time data associated with the recipient. The voicemail server may obtain the real-time location and event data from the recipient's phone and combine it with the saved location and event data to determine the content for the voicemail greeting message. The voicemail server may further select one or more templates based on the relationship between the caller and the recipient and the location and event content and generate a dynamic greeting message to be transmitted to the caller.

20 Claims, 6 Drawing Sheets

METHODS AND SYSTEMS FOR GENERATING DYNAMIC VOICEMAIL GREETINGS

BACKGROUND

The voicemail system is generally used in a telephone network to generate a greeting message to a caller when the recipient is not answering the call. The recipient can later access his/her voicemail to retrieve the recorded message from the caller. In general, the voicemail greeting is set using either the system default greeting message or the pre-recorded human voice message. The pre-recorded voicemail greeting is normally the same message regardless of who the caller is, when the call is received, or where the recipient is located when the call is received.

The pre-recorded voicemail greeting can be updated from time to time to inform the caller that the recipient is absent due to travel or other arrangements. However, the update is normally done by re-recording the greeting message prior to the travel or the arrangements. For mobile phone users, quite often, the voicemail greeting is set when a user activates the new service and is never changed after that. Every caller may hear the same pre-set greeting message with no further information about the called party.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
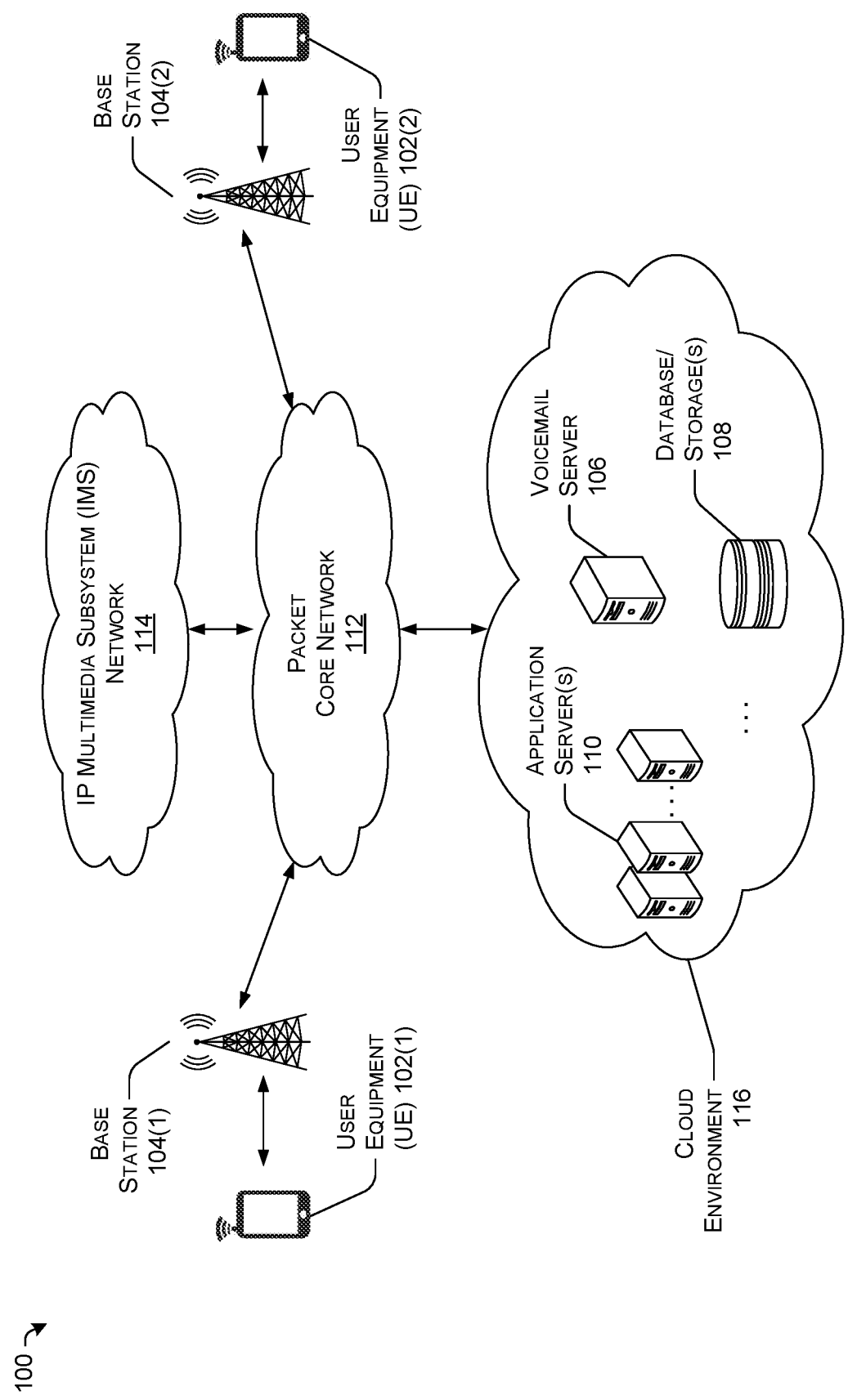
FIG. 1 illustrates an example network scenario, in which methods for generating dynamic voicemail greetings are implemented according to an existing technique.

Techniques for generating dynamic voicemail greetings are disclosed herein. In some implementations, a method for generating dynamic voicemail greetings may be implemented on a server device, e.g., a voicemail server. A voicemail server may receive a voice call from a caller to a voice mailbox of a recipient. The voicemail server may analyze the caller information and determine a relationship between the caller and the recipient. In some examples, the voicemail server may obtain the recipient's saved information from a storage device. The recipient's saved information may include the contact information of the recipient, the last updated location information, the last updated calendar information, the last updated notes and tasks, the last updated app data, etc. The voicemail server may determine the content for a voicemail greeting message based on the saved recipient's information. The content for the voicemail greeting message may be customized based at least in part on the relationship between the caller and the recipient and the recipient's saved information, for example, the saved location information, the saved event information, etc.

In some examples, the voicemail server may determine one or more templates for the voicemail greeting message. By way of example and without limitation, the one or more templates may include a general greeting template, a special greeting template, a location-based template, an event-based template, a time-based template, etc. The template may be in a format of a word, a phrase, a sentence with blanks to fill in data, a complete sentence, etc. In some examples, the template may comprise one or more features of the location, the event, or the time, etc.

As discussed herein, the voicemail server may compile the content (e.g., the location content, the event content, the time content, etc.) and the one or more templates to generate a complete context of the voicemail greeting message. In implementations, the voicemail server may further select a voice or a tone, and one or more languages to play the voicemail greeting message to the caller.

In some examples, the voicemail server may obtain the real-time recipient's information from a user equipment (UE) of the recipient. In implementations, the voicemail server may obtain the real-time location data of the UE, the up-to-date event data stored in the UE, the up-to-date notes and/or tasks stored on the UE, the up-to-date event data associated with individual apps installed on the UE, etc. In some examples, the voicemail server may compare the saved recipient's information with the real-time recipient's information and determine the actual location and the up-to-date schedules of the recipient when the voice call comes in. The voicemail server may further generate a voicemail greeting message to reflect the dynamic information associated with the recipient.

Existing techniques use a system default voicemail greeting or a voicemail greeting most likely recorded when a user activates his/her phone service. Although the voicemail greeting can be updated from time to time based on needs. The voicemail greeting has not yet been able to catch the up-to-date information of the recipient such as, where the recipient is located at when the voice call comes in, any event the recipient is attending, any special day for the recipient, etc. The present disclosure utilizes the user information periodically backed up from the UE to a network/cloud storage as well as the real-time user information from the UE to generate the voicemail greeting message. Not only the voicemail greeting message is customized for the caller but the content of the voicemail greeting message is chosen to reflect the up-to-date information of the recipient (e.g., location, schedule, event, task, etc).

The techniques discussed herein may be implemented in a computer network using one or more of protocols including but are not limited to Ethernet, 3G, 4G, 4G LTE, 5G, 6G, the further radio access technologies, or any combination thereof. In some examples, the network implementations may support standalone architectures, non-standalone architectures, dual connectivity, carrier aggregation, etc. Example implementations are provided below with reference to the following figures.

FIG. 1 illustrates an example network scenario, in which methods for generating dynamic voicemail greetings are implemented according to an existing technique.

The network scenario 100, as illustrated in FIG. 1, may include a telecommunication network of a wireless service provider such as, T-Mobile, AT&T, Sprint, Verizon Wireless, etc. The telecommunication network may include one or more access networks and one or more core networks.

The one or more access networks may be compatible with one or more radio access technologies, protocols, and/or standards, such as 5G NR technology, LTE/LTE Advanced technology, other Fourth Generation (4G) technology, High-Speed Data Packet Access (HSDPA)/Evolved High-Speed Packet Access (HSPA+) technology, Universal Mobile Telecommunication System (UMTS) technology, Code Division Multiple Access (CDMA) technology, Global System for Mobile Communications (GSM) technology, WiMAX technology, Wi-Fi technology, and/or any other previous or future generation of radio access technology. As illustrated in FIG. 1, the one or more access networks may include a plurality of base stations, for example, base station 104(1), or base station 104(2) (referred to as base station 104 hereinafter). As discussed herein, the base station 104 may be 2G base stations and/or 3G NodeBs that are associated with GSM and CDMA access network, eNodeB associated with a 4G/LTE RAN, or gNodeB associated with a 5G radio access network (RAN). In some examples, the one or more access networks may include digital subscriber line (DSL) and variations of DSL technology that provide access to desktops, workstations, and/or mainframes. In yet other examples, the one or more access networks may include Wi-Fi connections to the user equipment.

The core network may be referred to as a backbone network of the telecommunication network. The core network may be a packet core network 112, as illustrated in FIG. 1. In implementations, the packet core network 112 may be an evolved packet core (EPC) network configured to provide converged voice and data on a 4G LTE network. In yet other implementations, the packet core network 112 may be a 5G core network that uses a cloud-aligned service-based architecture (SBA) to support authentication, security, session management and aggregation of traffic from connected devices. In some examples, the 5G core network enables a co-existence of the 5G core network with the previous generation network facilities of 2G, 3G, 4G, or 4G LTE networks, etc.

The network scenario 100 may also include an IP multimedia subsystem (IMS) network 114. The IMS network 114 may be configured to deliver the voice (VoIP) and other multimedia services over the packet core network 112.

A subscriber of the wireless service may use a user equipment, e.g., UE 102(1) or UE 102(2) (referred to as UE 102 hereinafter), to make a phone call to another subscriber of the wireless service, provided by the same or a different service provider. The UE 102 may be any device that can wirelessly connect to a telecommunication network. In some examples, the UE 102 may be a mobile phone, such as a smart phone or other cellular phone. In other examples, the UE 102 may be a personal digital assistant (PDA), a media player, a tablet computer, a gaming device, a smart watch, a hotspot, a personal computer (PC) such as a laptop, desktop, or workstation, or any other type of computing or communication device. In yet other examples, the UE 102 may include the computing devices implemented on the vehicle including but are not limited to, an autonomous vehicle, a self-driving vehicle, or a traditional vehicle capable of connecting to internet. In yet other examples, the UE 102 may be a wearable device and/or wearable materials, such as a smart watch, smart glasses, clothes made of smart fabric, etc.

As discussed herein, the UE 102 may need to be registered on the IMS network 114 in order to use the IP multimedia service over the packet core network 112. In some examples, once the UE 102 is registered on the IMS network 114 and a data session is established, the UE 102 may access the resources on a cloud environment 116. The UE 102 may use the multimedia services provided by application server(s) 110 residing on the cloud environment 116 or access the data stored in the database/storage(s) 108. In another examples, a voice session can be established between a caller UE and a recipient UE, for example, between UE 102(1) and UE 102(2). There are circumstances that the recipient is not answering the phone call. The voicemail server 106 may generate a voicemail greeting message to be heard by the caller. After the recipient UE rings for a threshold of times, the voicemail server 106 may transmit the voicemail greeting message to the caller UE.

In existing scenarios, the voicemail greeting message may be a system default voicemail greeting message or a pre-recorded when the service is first activated. Even the voicemail greeting message can be updated from time to time, the content of the greeting may be still lack of sufficient and up-to-date information about the user. For example, the voicemail greetings may be pre-recorded as "You've reached 202-123-4567. Please leave your message." An updated voicemail greetings could be "You've reached 202-123-4567. I am on vacation now. Please leave your message."

As nowadays, people more and more rely on the mobile phones. The phone calls to a land line phone or an IP phone may also be forwarded to the mobile phone. The mobile phone of a user contains rich information about the user's contacts, the user's work and personal schedules, the user's notes on special events, the user's location provided through the GPS function, etc. The present disclosure utilizes the rich information provided by the mobile phone, either periodically updated to the cloud or in real-time, to generate a dynamic voicemail greeting. In implementations, the voicemail server 106 may retrieve the mobile phone backups from the database/storage(s) 108 and/or receive the real-time information from the mobile phone, compile the mobile phone backups and the real-time information to generate the voicemail greeting message. The voicemail greeting message enriched with the recipient's information can provide the context personalized based at least in part on the relationship between the caller and the recipient, the business and/or the personal schedules, the location of the recipient, special days or events information, etc.

Figure 2:
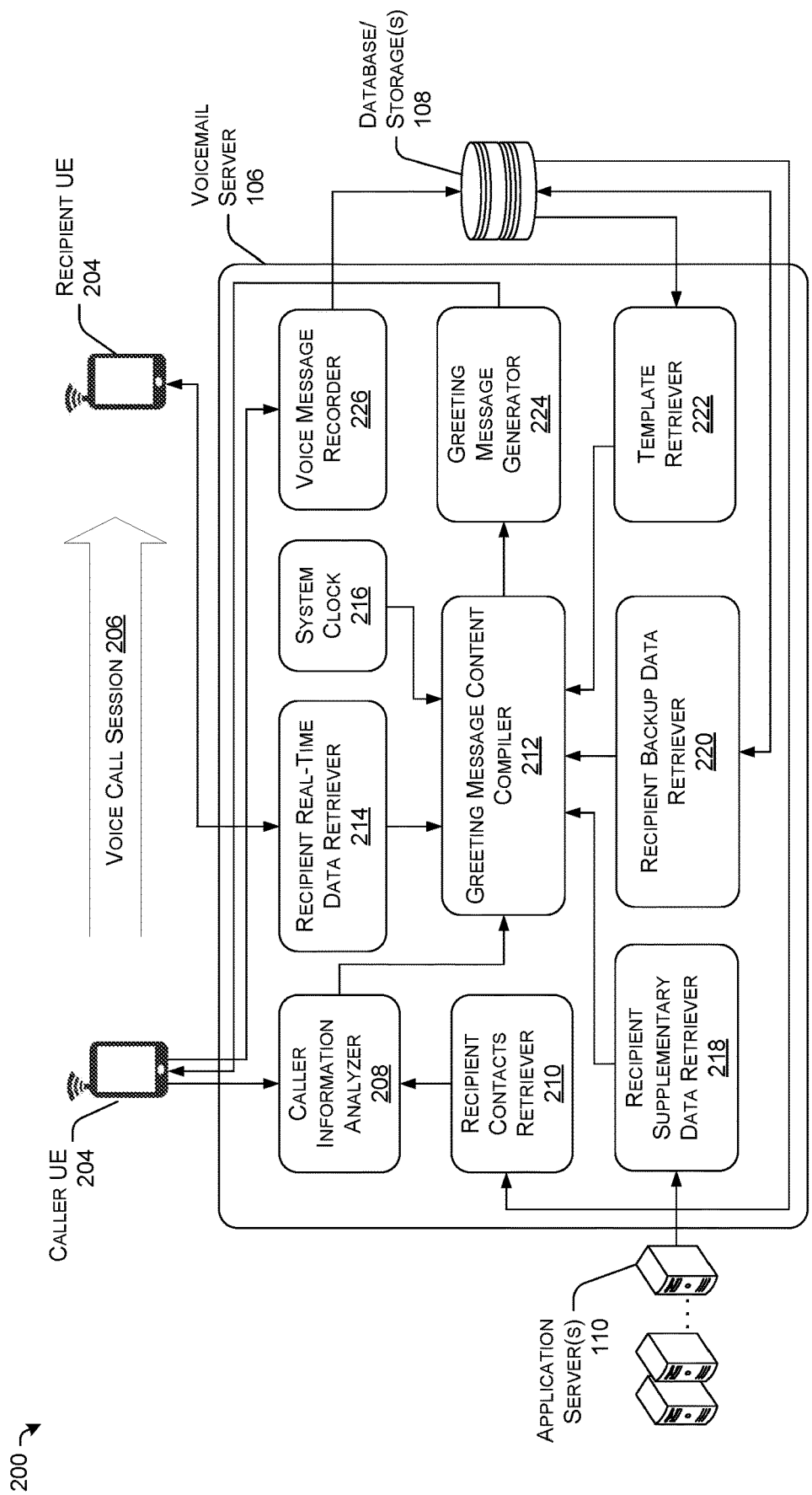
FIG. 2 illustrates an example diagram of a voicemail server, in which methods for generating dynamic voicemail greetings are implemented according to an example of the present disclosure.

FIG. 2 illustrates an example diagram of a voicemail server, in which methods for generating dynamic voicemail greetings are implemented according to an example of the present disclosure.

The example diagram 200 of a voicemail server (e.g., the voicemail server 106 shown in FIG. 1) may include a caller information analyzer 208, a recipient contacts retriever 210, a greeting message content compiler 212, a recipient real-time data retriever 214, a system clock 216, a recipient supplementary data retriever 218, a recipient backup data retriever 220, a template retriever 222, a greeting message generator 224, a voice message recorder 226.

As illustrated in the example diagram 200, a voice call 206 is initiated from a caller UE 202 and directed to a recipient UE 204. When the recipient is not answering the call or the call is directly forwarded to the voice mailbox, the recipient contacts retriever 210 may retrieve the contact data of the recipient from the database/storage(s) 108 and provide the contact information of the recipient to the caller information analyzer 208. The contact information of the recipient may be a recent backup from the recipient UE 204 to the database/storage(s) 108. The contact information of the recipient may include the names and phone numbers of the contacts, the addresses of the contacts, additional notes placed for the contacts, etc. The caller information analyzer 208 may compare the caller phone number and/or the caller name with the contact information of the recipient and provide the caller information to the greeting message content compiler 212. For example, when there is no match between the caller phone number with a contact of the recipient, the caller information analyzer 208 may provide an output indicating "an unknown caller" to the greeting message content compiler 212. In another example, the caller information analyzer 208 may provide an output indicating "caller being your mother" to the greeting message content compiler 212.

In some examples, the recipient backup data retriever 220 may retrieve the backup data of the recipient UE 204 from the database/storage(s) 108 and provide the backup data to the greeting message content compiler 212. The backup data of the recipient UE 204 may include the data associated with multiple apps installed on the recipient UE 204, which has been periodically backed up to the cloud. For instance, the backup data may include the photos, calendar events, location data, notes, Word docs, Excel forms, etc.

In another example, the recipient real-time data retriever 214 may also retrieve the real-time data from the recipient UE 204. In yet another example, the recipient supplementary data retriever 218 may also retrieve the supplementary data associated with some apps installed on the recipient UE 204 such social media apps data, exercise apps data, video streaming apps watch list, etc. The supplementary data may be retrieved from the storages of the application server(s) 110, or the database/storage(s) 108. The real-time data from the UE 204 and the supplementary data associated with the recipient may be provide to the greeting message content compiler 212.

The template retriever 222 may be configured to retrieve the templates of voicemail greeting message from the database/storage(s) 108 and provide the templates to the greeting message content complier 212. The templates of the voicemail greeting message may include words, phrases, sentences with blanks, complete sentences, etc.

The greeting message content compiler 212 may compile one or more of the caller information provided by the caller information analyzer 208, the backup data provided by the recipient backup data retriever 220, the real-time data provided by the recipient real-time data retriever 214, the supplementary data provided by the recipient supplementary data retriever 218, and the time data provided by the system clock 216 to obtain the content for the voicemail greeting message. The voicemail greeting message content compiler 212 may further interpolate the content to one or more templates and generate a voicemail greeting context customized for the voice call 206. The greeting message generator 224 may generate the greeting message based on the voicemail greeting context, a selected voice/tone, one or more selected languages, etc.

The voice message recorder 226 may be configured to record the voicemail from the caller UE 202 if the caller decides to leave a message after hearing the voicemail greeting message. The recorded voicemail may be saved in the database/storage(s) 108 and forwarded to the recipient UE 204 once the recording is finished.

It should be understood that the function modules of the example diagram 200 of the voicemail server are for the purpose of illustration. The present disclosure is not intended to be limiting. One or more of the function modules (i.e., the caller information analyzer 208, the recipient contacts retriever 210, the greeting message content compiler 212, the recipient real-time data retriever 214, the system clock 216, the recipient supplementary data retriever 218, the recipient backup data retriever 220, the template retriever 222, the greeting message generator 224, the voice message recorder 226) may be integrated into a single module. The voicemail server 106 may also have one or more local storage devices that are communicatively coupled to the cloud environment.

Figure 3:
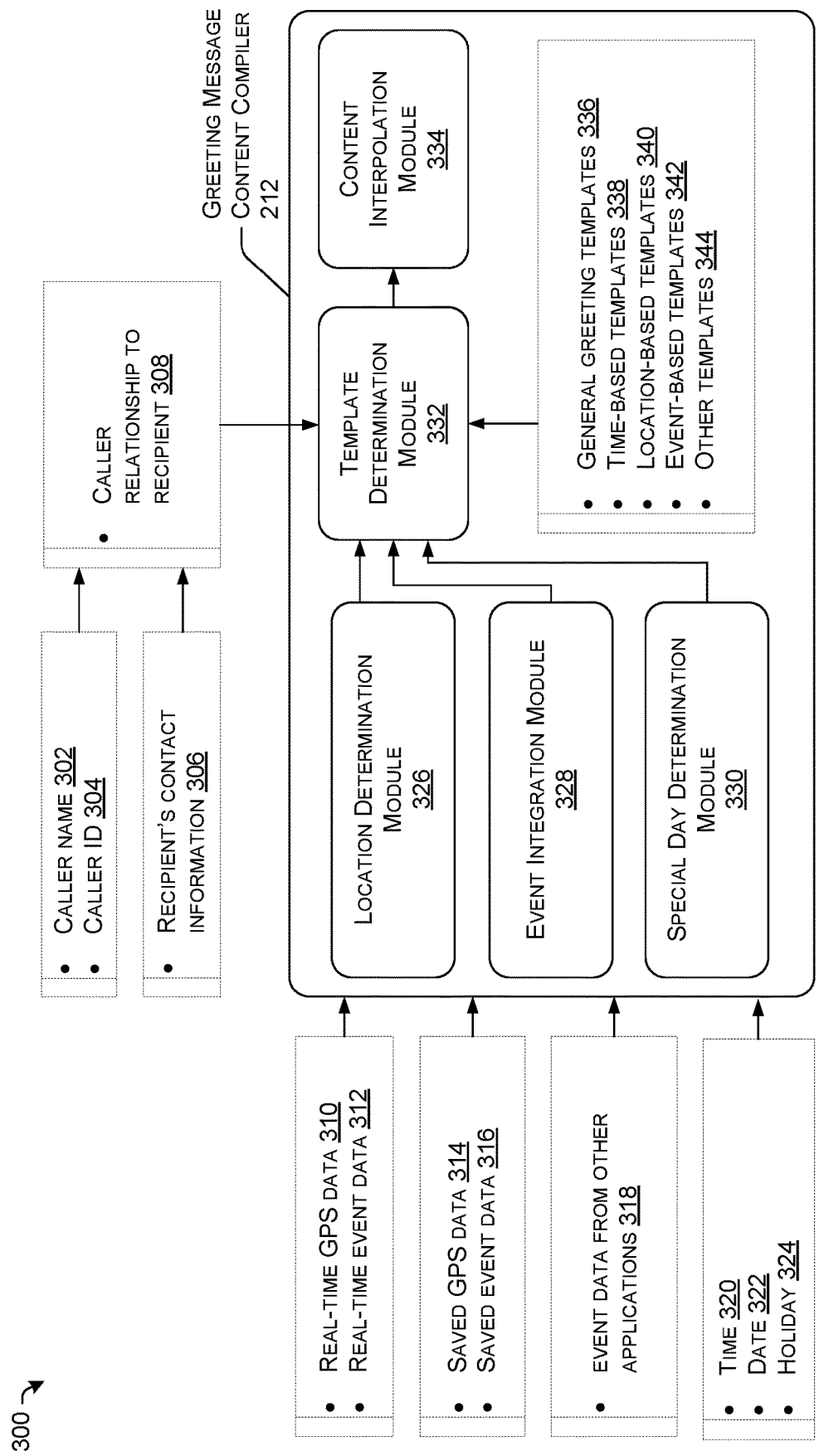
FIG. 3 illustrates an example diagram of a greeting message content compiler of a voicemail server, in which methods for generating dynamic voicemail greetings are implemented according to an example of the present disclosure.

FIG. 3 illustrates an example diagram of a greeting message content compiler of a voicemail server, in which methods for generating dynamic voicemail greetings are implemented according to an example of the present disclosure.

The example diagram 300 of a greeting message content compiler (e.g., the greeting message content compiler 212) may include a location determination module 326, an event integration module 328, a special day determination module 330, a template determination module 332, and a content interpolation module 334.

As discussed herein, when a voice call is initiated from a caller UE (e.g., the caller UE 202 shown in FIG. 2), a caller name 302 and a caller ID 304 may be transmitted to the recipient UE (e.g., the recipient UE 204 shown in FIG. 2). The caller name 302 and the caller ID 304 along with the recipient contact information 306 may be used to determine the caller relationship to the recipient 308. The recipient contact information 306 may be provided by the recipient contacts retriever 210 of the voicemail server 106 (shown in FIG. 2). The caller relationship to the recipient 308 may be determined by the caller information analyzer 208 of the voicemail server 106, as shown in FIG. 2.

In some examples, the recipient real-time data retriever 214 of FIG. 2 may provide the real-time GPS data 310 and the real-time event data 312 associated with the recipient UE 204. The recipient backup data retriever 220 of FIG. 2 may provide the saved GPS data 314 and the saved event data 316 associated with the recipient UE 204. The recipient supplementary data retriever may provide the event data from other applications 318 associated with the recipient UE 204. The system clock 216 may provide the time-based information such as, time 320, date 322, and holiday 324.

The location determination module 326 may be configured to determine the location content for the voicemail greeting message. In some examples, when the real-time GPS data 310 is accessible, the location determination module 326 may use the real-time GPS data 314 as the location content for the voicemail greeting message. In some other examples, the real-time GPS data 310 is unavailable (e.g., the recipient UE 204 being out of service or powered off), the location determination module 326 may use the saved GPS data 314 as the location content for the voicemail greetings. In yet other examples, when the real-time GPS data 310 is unavailable, the saved event data 316 and/or the event data from other applications 318 may also be used to determine the location content for the voicemail greeting message. For instance, the recipient may have a meeting scheduled through Eventbrite. The meeting information is sent through Gmail but is not automatically added to the calendar of the mobile phone. The location determination module 326 may utilize the event data associated with Eventbrite or Gmail calendar to determine the location of the recipient.

The event integration module 328 may be configured to combine the real-time event data 312, the saved event data 316, and the event data from other applications 318 to determine the event content for the voicemail greeting message. In some examples, the real-time event data 312 may be used as the event content for the voicemail greetings. In some other examples, when the real-time event data 312 is unavailable, the saved event data 316 and/or the event data from other applications 318 may also be used to determine the event content for the voicemail greetings. In yet other examples, the event data may also indicate a category of the event, e.g., business, personal, leisure, self-improvement, etc. Based on the priority level set by the recipient, the event having a higher priority may be set as the event content for the voicemail greeting message.

The special day determination module 330 may be configured to determine the special day content for the voicemail greetings based at least in part on the holiday 324, the real-time event data 312, the saved event data 316, or the event data from other applications 318. In some examples, the special day content may indicate a national holiday, an observed holiday, a birthday, an anniversary, a travel day, etc.

The template determination module 332 may be configured to select one or more templates to generate the voicemail greeting message. The template determination module 332 may select the templates based at least in part on the caller relationship to recipient 308, the location content provided by the location determination module 326, the event content provided by the event integration module 328, or the special day content provided by the special day determination module 330. The templates for the voicemail greeting message may include general greeting templates 336, time-based templates 338, locate-based templates 340, event-based templates 342, other temples 344, etc.

In some examples, the general greeting templates 336 may include the greeting messages that can be used as is. For instance, the general greeting templates 336 may include words/phrases/sentences like, "Hello," "Thanks for calling," "Please leave your message after the tone." The general greeting templates 336 may be used to generate a greeting message for the phone calls from the unknown callers. For instance, an unknown caller may hear the voicemail greetings as "Hi, thanks for calling. Please leave your message." In some examples, the general greeting templates 336 can also be combined with the time-based templates 338, the location-based templates 340, and the event-based templates 342 to generate a customized voicemail greeting message.

The time-based templates 338 may include the phrases or sentences with blank spaces to fill in the starting date/time and the ending date/time. One example of the time-based templates 338 may be a phrase of "from _____ to _____."

The location-based templates 340 may include the phrases or sentences with blank spaces to fill in the location content. In circumstances that the location of the recipient is not to be disclosed, the general location description phrases may be used for the greeting message. For example, the location-based templates 340 may be "I am in _____ for a business trip," "I am in _____ for vacation," or "I am out of the office" without disclosing the actual location, etc.

Similarly, the event-based templates 342 may include the phrases or sentences with blank spaces to fill in the event content. The event-based templates 342 may indicate a specific event that the recipient is attending when the phone call comes in or include merely a general description of being way. For example, the event-based templates 342 may be "I am attending _____," or "I am in a meeting right now."

The other templates 344 may be used to generate certain greeting content for phone calls from some special callers. For instance, a business partner may further hear the message of "I will call you back after the meeting." In another example, an intimate family member may hear the message of "I love you" at the end of the voicemail greeting message. The template determination module 332 may determine whether to use the other templates 344 based at least in part on the caller relationship to recipient 308, the event content, or the special day content.

It should be understood that the time-based templates 338, the location-based templates 340, and the event-based templates 342 may have certain levels of overlap. Although these templates are shown separately in FIG. 3, they may be merged into one dynamic greeting template. In implementations, a dynamic greeting template may contain one or more of the time-based template language, the location-based template language, and the event-based template language. In some examples, a dynamic greeting template may include the time-based template language and the location-based template language only such as, "I am in _____ from _____ to _____." In another example, a dynamic greeting template may include the time-based template language and the event-based template language only such as, "I am attending _____ from _____ to _____." In yet another example, a dynamic greeting template may include the location-based template language and the event-based template language only such as, "I am attending _____ at _____." In yet another example, a dynamic greeting template may include all the time-base template language, the location-based template language and the event-based template language such as, "I am attending _____ at _____ from _____ to _____."

Based at least in part on the location content, the event content, the special day content, the caller relationship to recipient 308, the content interpolation module 334 may interpolate the content to the selected template and generate a dynamic voicemail greeting message to be heard by the caller.

It should be understood that the various GPS data, the event data, the location determination module 326, the event integration module 328, the special day determination module 330, the template determination module 332, and the content interpolation module 334 shown in FIG. 3 are for the purpose of illustration. The present disclosure is not intended to be limiting. Aside from the GPS data, the event data, and the time-based data, information populated in the social media apps, short messages, chatting group, etc., may also be used to determine the location and the event associated with the recipient.

Figure 4:
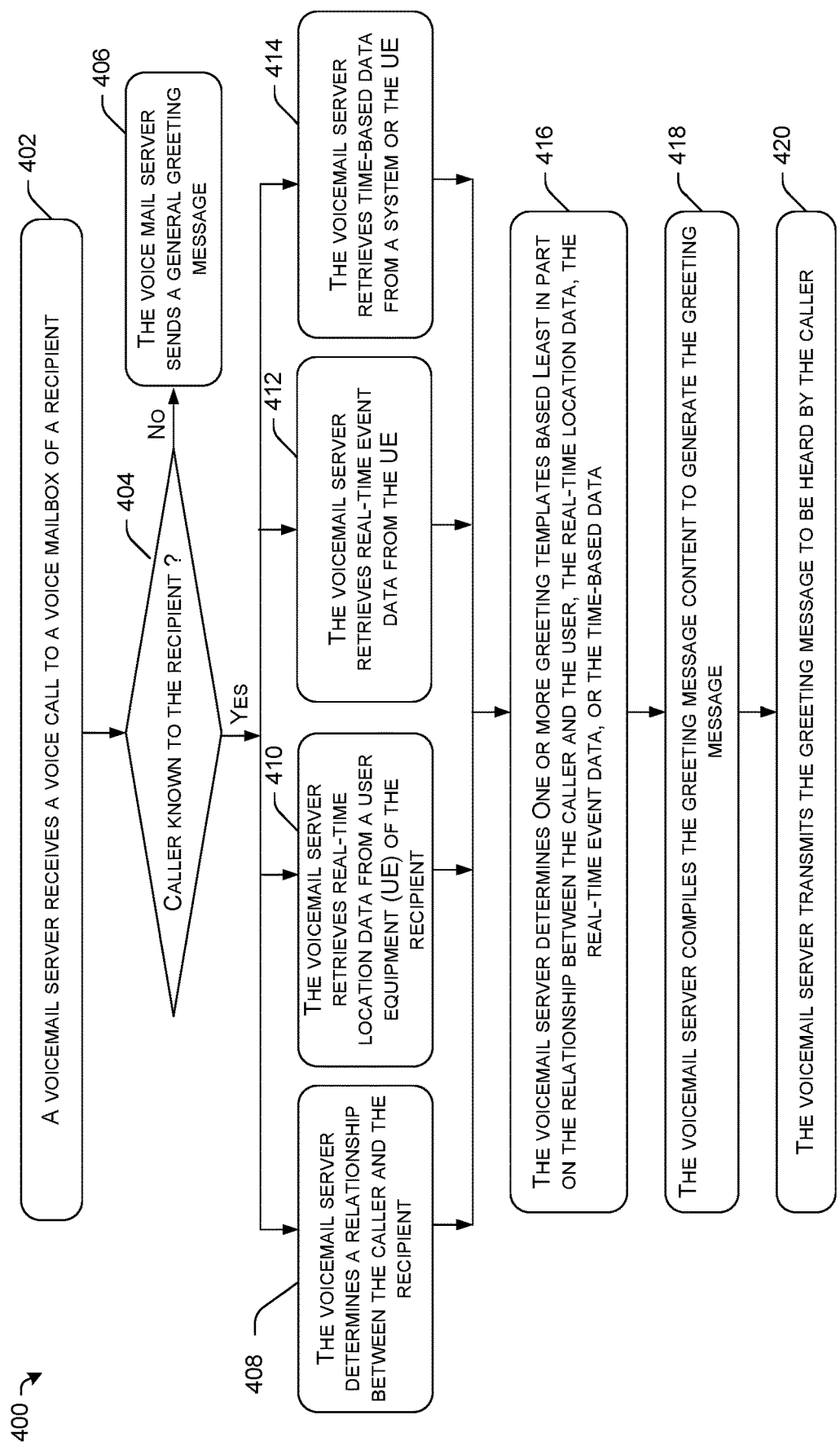
FIG. 4 illustrates an example process for generating dynamic voicemail greetings according to an example of the present disclosure.

FIG. 4 illustrates an example process for generating dynamic voicemail greetings according to an example of the present disclosure. The example process 400 may be accomplished by the voicemail server 106, as illustrated in FIGS. 1-2. Although the example process 400 is depicted as including a number of operations and/or an apparent flow of operations, example process 400 may include more or less operations, repeat operations, and/or one or more of the operations may be conducted serially, in parallel, and/or in a different order than that shown in the figures.

At operation 402, a voicemail server may receive a voice call to a voice mailbox of a recipient. The caller and the recipient may be subscribers of the wireless services provided through the same or different service providers. The voicemail server may be any computing devices communicatively coupled to the telecommunication networks. In some examples, the voicemail server may be located in a cloud network of the wireless service provider.

At operation 404, the voicemail server may determine whether the caller is known to the recipient. The voicemail server may compare the caller's name and/or the caller's phone number with the contacts of the recipient and determine whether there is a match. When the caller is unknown to the recipient, at operation 406, the voicemail server may send a general greeting message. In some examples, the general greeting message may be a default greeting message with no personal information.

When the caller is known to the recipient, at operation 408, the voicemail server may determine a relationship between the caller and the recipient. The voicemail server may determine the relationship between the caller and the recipient based on the recipient's contact information. For instance, the recipient's contact information may include notes or descriptions for certain contacts to indicate the relationship.

At operation 410, the voicemail server may retrieve real-time location data from a user equipment (UE) of the recipient. In some examples, the voicemail server may send a request to the UE of the recipient, triggering an on-demand data uploading from the UE. The real-time location data may include the real-time coordinates of the UE in the decimal degrees, a signature building where the UE is located at, a street address near the UE, etc.

At operation 412, the voicemail server may retrieve the real-time event data from the UE. As discussed herein, the real-time event may include up-to-date events on the calendar app of the UE. In some examples, the calendar app of the UE may include event data from different calendar sources such as, calendar on the phone, Outlook calendar, iCloud calendar, Gmail calendar, subscribed school band calendar, etc. In some examples, certain types of event data may be stored only in the apps (i.e., not added to the calendar app of the UE). The voicemail server may also obtain the calendar data from the corresponding apps. For instance, the voicemail server may obtain the calendar data from TeamSnap and determine that the user is going to a baseball game.

At operation 414, the voicemail server may retrieve time-based data from a system or from the UE. In general, a system clock (e.g., the system clock 216 of FIG. 2) may provide the date, time, and special days information such as holidays. Time-based data from the UE may further indicate a time-zone change.

At operation 416, the voicemail server may determine one or more greeting templates based at least in part on the relationship between the caller and the recipient, the real-time location data, the real-time event data, or the time-based data. In some examples, the voicemail server may select the templates based at least in part on the caller being a family member. In some other examples, the voicemail server may further select the location-based templates based at least in part on the relationship between the caller and the recipient. For instance, if the caller is an intimate family member of the recipient, the voicemail server may select a template that describes the actual location. If the caller is rather a friend, the voicemail server may select a template that merely describes the status being out of town. Similarly, the voicemail server may also select the event-based templates based at least in part on the relationship between the caller and the recipient. For family members and/or certain business partners, the templates may be chosen to disclose the detailed information of the event. While for other callers, the templates may be chosen to just describe the status being away.

At operation 418, the voicemail server may compile the greeting message content to generate the greeting message. As discussed herein, the voicemail server may interpolate one or more of the relationship between the caller and the recipient, the location data, the event data, or the time data into the selected templates and generate a complete voicemail greeting message. According to the present disclosure, the voicemail greeting message is generated dynamically based on one or more factors including who the caller is, where the recipient is located at when the phone call comes in, what event the recipient may be involved at the moment, any special day or event when the phone call comes in, etc.

At operation 420, the voicemail server may transmit the greeting message to be heard by the caller. As discussed herein, after a certain number of phone rings and the recipient is not answering, or if the phone call is directly forwarded to the voice mailbox, the voicemail server may generate the dynamic voicemail greeting message and transmit the voicemail greeting message to be played on the caller UE.

Figure 5:
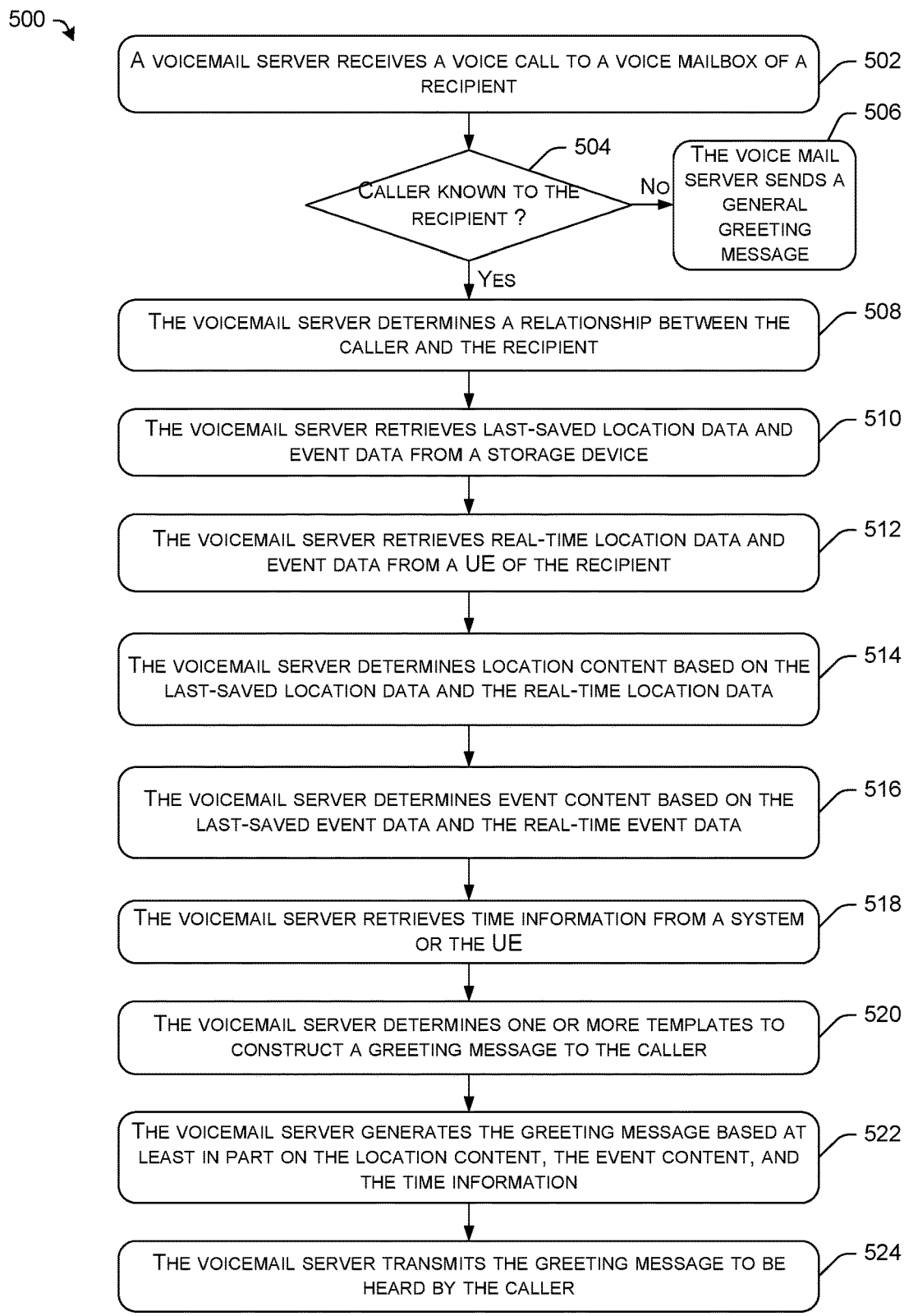
FIG. 5 illustrates another example process for generating dynamic voicemail greetings according to an example of the present disclosure.

FIG. 5 illustrates another example process for generating dynamic voicemail greetings according to an example of the present disclosure. The example process 500 may be accomplished by the voicemail server 106, as illustrated in FIGS. 1-2. Although the example process 500 is depicted as including a number of operations and/or an apparent flow of operations, example process 500 may include more or less operations, repeat operations, and/or one or more of the operations may be conducted serially, in parallel, and/or in a different order than that shown in the figures.

At operation 502, a voicemail server may receive a voice call to a voice mailbox of a recipient. At operation 504, the voicemail server may determine whether the caller is known to the recipient. When the caller is unknown to the recipient, at operation 506, the voicemail server may send a general greeting message. When the caller is known to the recipient, at operation 508, the voicemail server may determine a relationship between the caller and the recipient.

At operation 510, the voicemail server may retrieve the last-saved location data and event data from a storage device. The storage device may be locally coupled to the voicemail server or remotely located in a network or cloud environment.

At operation 512, the voicemail server may retrieve real-time location data and event data from a user equipment (UE) of the recipient. As discussed herein, the voicemail server may first retrieve the last-saved location data and event data from the storage device and further retrieve the real-time location data and event data from the UE of the recipient to better understand the whereabout of the recipient.

At operation 514, the voicemail server may determine the location content based on the last-saved location data and the real-time location data. In some examples, when the real-time location data is available, the voicemail server may compare the real-time location data with the last-saved location data. If the real-time location data is different from the last-saved location data, the voicemail server may use the real-time location data as the location content of the greeting message.

At operation 516, the voicemail server may determine event content based on the last-saved event data and the real-time event data. In some examples, the event data on the recipient UE may be updated from the last backup. The voicemail server may compare the last-saved event data with the real-time event data and determine whether there is a newly added event or a canceled event at the moment. In some examples, the voicemail server may also consider the event data associated with other individual apps not synchronized to the phone calendar.

At operation 518, the voicemail server may retrieve the time information. As discussed herein, the voicemail server may determine whether today is a national holiday, a special day such as the election day, or a holiday in another country, etc.

At operation 520, the voicemail server may determine one or more templates to construct a greeting message to the caller. By way of example and without limitation, the templates to construct the greeting message may include some general greeting templates, the time-based templates, the location-based templates, the event-based templates, other templates, etc. The templates may include a variety of greeting words, phrases, incomplete sentences (e.g., with blanks to fill in the location content, event content, time data, etc.), complete sentences, etc.

At operation 522, the voicemail server may generate the greeting message based at least in part on the relationship between the caller and the recipient, the location content, the event content, and the time information. In some examples, some templates may be used based on the relationship between the caller and the recipient. For instance, for a trusted family member, the voicemail server may generate the voicemail greeting message that fully discloses the location of the recipient with additional greetings. Yet in another example, for a business partner that involves in an ongoing project with the recipient, the voicemail server may generate the voicemail greeting message that specifically indicates the available time slots of the recipient.

At operation 524, the voicemail server may transmit the greeting message to the heard by the caller. In some examples, the voicemail server may choose a voice/tone and one or more languages to play the greeting message.

Figure 6:
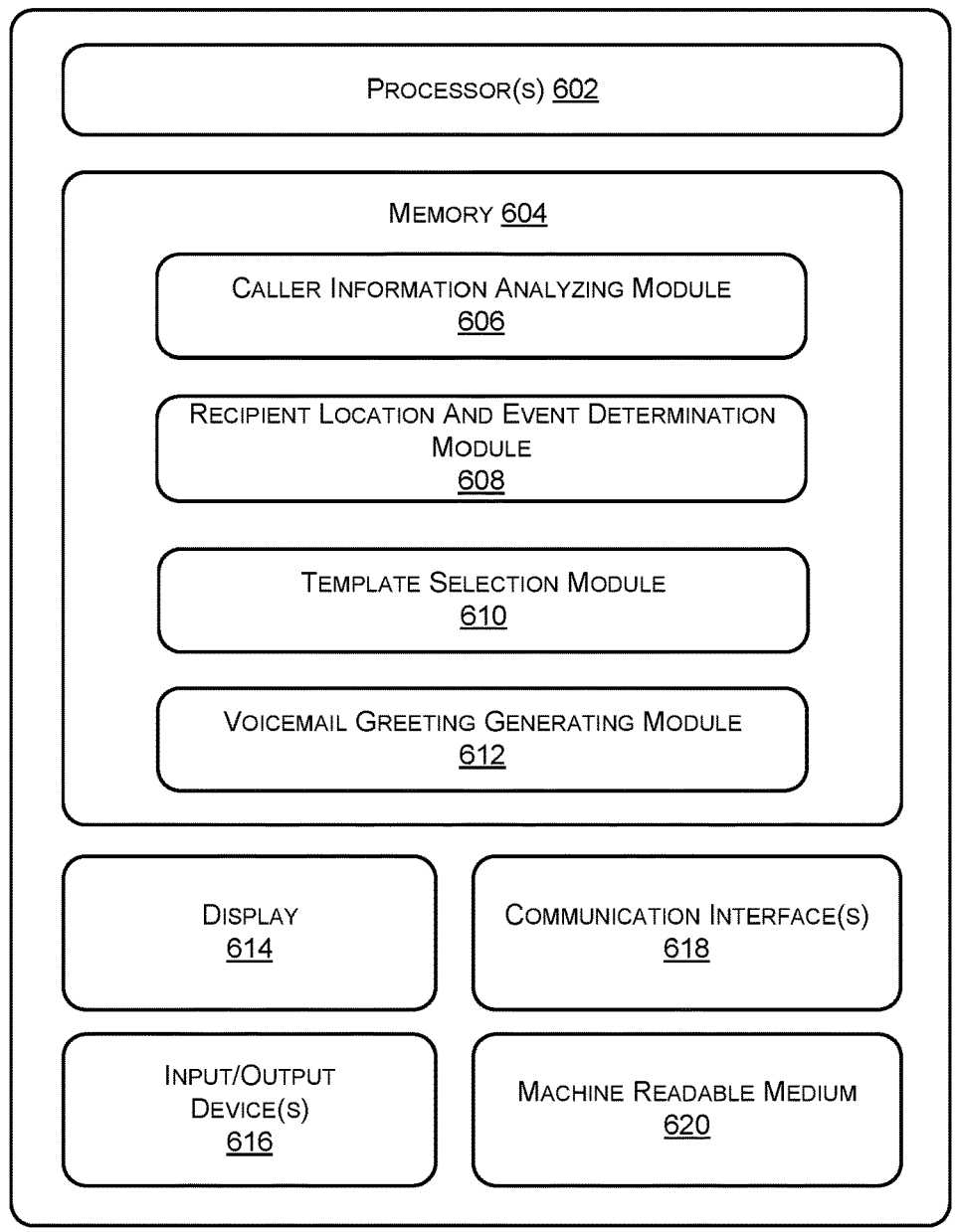
FIG. 6 illustrates an example voicemail server, in which methods for generating dynamic voicemail greetings are implemented according to the present disclosure.

FIG. 6 illustrates an example voicemail server, in which methods for generating dynamic voicemail greetings are implemented according to the present disclosure. The example voicemail server 600 may correspond to the voicemail server 106, as illustrated in FIGS. 1-2.

As illustrated in FIG. 6, a voicemail server 600 may comprise processor(s) 602, a memory 604 storing a caller information analyzing module 606, a recipient location and event determination module 608, and a template selection module 610, a voicemail greeting generating module 612, a display 614, input/output device(s) 616, communication interface(s) 618, and/or a machine readable medium 620.

In various examples, the processor(s) 602 can be a central processing unit (CPU), a graphics processing unit (GPU), or both CPU and GPU, or any other type of processing unit. Each of the one or more processor(s) 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 602 may also be responsible for executing all computer applications stored in memory 604, which can be associated with common types of volatile (RAM) and/or nonvolatile (ROM) memory.

In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the voicemail server 600. Any such non-transitory computer-readable media may be part of the voicemail server 600.

The caller information analyzing module 606 may perform at least some functions of the caller information analyzer 208 and the recipient contacts retriever 210 of FIG. 2. As discussed herein, the caller information analyzing module 606 may be configured to determine whether the caller is a known contact of the recipient, and if the caller is known to the recipient, the relationship between the caller and the recipient. The caller information analyzing module 606 may access the contact information of the recipient from the machine readable medium 620 or from a database/storage(s) remotely connected to the voicemail server. The caller information analyzing module 606 may determine whether there is a match between the caller name and/or the caller ID (usually a telephone number) and the contact information. If there is a match, the caller information analyzing module 606 may determine that the caller is a known contact to the recipient. In some examples, the caller information analyzing module 606 may further determine whether the caller is a family member, a friend, or a colleague based on the notes that the recipient added to the contact list.

The recipient location and event determination module 608 may perform one or more functions of the recipient backup data retriever 220, the recipient real-time data retriever 214, the recipient supplementary data retriever 218, and the system clock 216 of FIG. 2. As discussed herein, the recipient location and event determination module 608 may be configured to determine the location content and the event content for the voicemail greeting messages based on the location data and the event data retrieved from various sources. In examples, a combination of one or more of the real-time location data and event data from the recipient's phone, the backup location data and event data of the recipient' phone, and the event data associated with the individual apps but not synchronized to the phone may be used to determine the location and event content for the voicemail greeting message.

The template selection module 610 may perform the functions of the template retriever 222 of FIG. 2. The template selection module 610 may be configured to select the templates suitable to generate the voicemail greeting message to the caller. The template selection module 610 may select one or more of a general greeting template, a personalized greeting template, a location-based template, an event-based template, a time-based template, etc.

The voicemail greeting generating module 612 may perform the functions of the greeting message content compiler 212 and the greeting message generator 224 of FIG. 2. The voicemail greeting generating module 612 may be configured to compile the location content, the event content, time data, and the selected one or more templates to generate a voicemail greeting message. In implementations, the voicemail greeting generating module 612 may insert the location content, the event content, the time data into the one or more templates, add some additional greeting languages if needed, and select the appropriate voice and language to generate a complete voicemail greeting message.

The communication interface(s) 618 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 618 can be compatible with multiple radio access technologies, such as 5G radio access technologies and 4G/LTE radio access technologies. Accordingly, the communication interfaces 618 can allow the voicemail server 600 to connect to the 5G system described herein.

Display 614 can be a liquid crystal display or any other type of display commonly used in the voicemail server 600. For example, display 614 may be a touch-sensitive display screen and can then also act as an input device or keypad, such as for providing a soft-key keyboard, navigation buttons, or any other type of input. Input/output device(s) 616 can include any sort of output devices known in the art, such as display 614, speakers, a vibrating mechanism, and/or a tactile feedback mechanism. Input/output device(s) 616 can also include ports for one or more peripheral devices, such as headphones, peripheral speakers, and/or a peripheral display. Input/output device(s) 616 can include any sort of input devices known in the art. For example, input/output device(s) 616 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 620 can store one or more sets of instructions, such as software or firmware, that embodies any one or more of the methodologies or functions described herein. The instructions can also reside, completely or at least partially, within the memory 604, processor(s) 602, and/or communication interface(s) 618 during execution thereof by the voicemail server 600 The memory 604 and the processor(s) 602 also can constitute machine readable media 620.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method, the method comprising:
   receiving a voice call from a caller to a voice mailbox of a recipient;
   determining caller data associated with the voice call;
   retrieving at least event-based data associated with the recipient; and
   generating a greeting message based at least in part on the caller data and the event-based data, wherein an event content of the greeting message is from an event having a higher priority, the higher priority specified in the event-based data and based at least in part on a category of the event indicated in the event-based data.

2. The method of claim 1, further comprising retrieving at least one of time-based data and location-based data associated with the recipient, wherein:
   the time-based data indicates a date and a time when the voice call is received,
   the location-based data includes global positioning system (GPS) data associated with a user equipment (UE) of the recipient, and
   the event-based data includes calendar data from the UE.

3. The method of claim 2, further comprising:
   retrieving, from the UE, real-time GPS data and real-time calendar data;
   retrieving, from a cloud storage, other calendar data associated with the recipient, wherein generating the greeting message is further based at least in part on the real-time GPS data, the real-time calendar data, or other calendar data.

4. The method of claim 2, wherein the GPS data and the calendar data is periodically transmitted from the UE and stored in a cloud storage, and the method further comprises:
retrieving, from the cloud storage, the GPS data and the calendar data, wherein generating the greeting message is further based at least in part on the time-based data, the GPS data, or the calendar data.

5. The method of claim 1, wherein the caller data includes a relationship between the caller and the recipient, and the method further comprises:
determining, based on contact information of the recipient, the relationship between the caller and the recipient.

6. The method of claim 5, further comprising:
selecting, based at least in part on the relationship between the caller and the recipient, one or more greeting templates;
customizing the one or more greeting templates based on at least one of time-based data associated with the recipient, location-based data associated with the recipient, or the event-based data; and
generating the greeting message based further on the customization.

7. The method of claim 6, wherein the one or more greeting templates includes a first greeting template associated with the event-based data, and the method further comprises:
customizing the first greeting template to provide a first time period that the recipient is attending the event or a second time period that the recipient is available.

8. The method of claim 6, wherein the one or more greeting templates includes a second greeting template associated with the location-based data, and the method further comprises:
customizing the second greeting template to provide at least one of a location, a first time period that the recipient is at the location, or a second time period that the recipient is back from the location.

9. The method of claim 6, wherein the one or more greeting templates includes a third greeting template associated with the time-based data, and the method further comprises:
customizing the third greeting template to provide information related to a holiday, a business day, or other event day.

10. A system comprising:
a processor,
a network interface, and
a memory storing instructions executed by the processor to perform actions including:
receiving a voice call from a caller to a voice mailbox of a recipient;
determining caller data associated with the voice call;
retrieving at least location-based data associated with the recipient; and
generating a greeting message based at least in part on the caller data and the location-based data, wherein the generating includes selecting one of a first location-based template for including location information of the recipient or a second location-based template for including no location information of the recipient based at least in part on whether the caller data includes a relationship between the caller and the recipient, and utilizing the selected one of the first and second location-based templates to generate the greeting message.

11. The system of claim 10, wherein the retrieving further comprises retrieving at least one of time-based data and event-based data associated with the recipient, and wherein:
the time-based data indicates date and time when the voice call is received,
the location-based data includes global positioning system (GPS) data associated with a user equipment (UE) of the recipient, and
the event-based data includes calendar data from the UE.

12. The system of claim 11, wherein the actions further comprise:
retrieving, from the UE, real-time GPS data and real-time calendar data;
retrieving, from a cloud storage, other calendar data associated with the recipient; and
generating the greeting message based at least in part on the caller data, the real-time GPS data, the real-time calendar data, or other calendar data.

13. The system of claim 11, wherein the GPS data and the calendar data is periodically transmitted from the UE and stored in a cloud storage, and the actions further comprise:
retrieving, from the cloud storage, the GPS data and the calendar data, and
generating the greeting message based at least in part on the caller data, the time-based data, the GPS data, or the calendar data.

14. The system of claim 10, the actions further comprising:
determining, based on contact information of the recipient, the relationship between the caller and the recipient.

15. The system of claim 11, further comprising:
customizing multiple greeting templates including first location-based template and the second location-based template based on at least one of the time-based data, the location-based data, or the event-based data; and
generating the greeting message based on the customization.

16. The system of claim 15, wherein the multiple greeting templates includes a first greeting template associated with the event-based data, and the actions further comprise:
customizing the first greeting template to provide a first time period that the recipient is attending an event or a second time period that the recipient is available.

17. The system of claim 15, wherein the multiple greeting templates includes a second greeting template associated with the location-based data, and the actions further comprise:
customizing the second greeting template to provide at least one of a location, a first time period that the recipient is at the location, or a second time period that the recipient is back from the location.

18. The system of claim 15, wherein the multiple greeting templates includes a third greeting template associated with the time-based data, and the actions further comprise:
customizing the third greeting template to provide information related to a holiday, a business day, or other event day.

19. A computer-readable storage medium storing computer-readable instructions, that when executed by a processor, cause the processor to perform actions comprising:
receiving a voice call from a caller to a voice mailbox of a recipient;
determining caller data associated with the voice call;
retrieving at least location-based data associated with the recipient; and generating a greeting message based at least in part on the caller data and the location-based data, wherein the generating includes selecting one of a first location-based template for including location information of the recipient or a second location-based template for including no location information of the recipient based at least in part on whether the caller data includes a relationship between the caller and the recipient, and utilizing the selected one of the first and second location-based templates to generate the greeting message.

20. The computer-readable storage medium of claim 19, wherein the actions further comprise:
   retrieving, from a user equipment (UE) of the recipient, real-time GPS data and real-time calendar data;
   retrieving, from a cloud storage, other calendar data associated with the recipient; and
   generating the greeting message based at least in part on the caller data, the real-time GPS data, the real-time calendar data, or other calendar data.

* * * * *